United States Patent
Gonzalez Leon et al.

(10) Patent No.: US 11,548,904 B2
(45) Date of Patent: Jan. 10, 2023

(54) SECONDARY ALCOHOL PHOSPHATE ESTER

(71) Applicant: Arkema France, Colombes (FR)

(72) Inventors: Juan Antonio Gonzalez Leon, Lyons (FR); Jean-Philippe Gillet, Brignais (FR); Gilles Barreto, Messimy (FR); Carl Bouret, Chateauroux (FR)

(73) Assignee: Arkema France, Colombes (FR)

( * ) Notice: Subject to any disclaimer, the term of this patent is extended or adjusted under 35 U.S.C. 154(b) by 85 days.

(21) Appl. No.: 16/761,652

(22) PCT Filed: Nov. 8, 2018

(86) PCT No.: PCT/FR2018/052762
§ 371 (c)(1),
(2) Date: May 5, 2020

(87) PCT Pub. No.: WO2019/092367
PCT Pub. Date: May 16, 2019

(65) Prior Publication Data
US 2021/0179644 A1 Jun. 17, 2021

(30) Foreign Application Priority Data
Nov. 10, 2017 (FR) .................................... 1760587

(51) Int. Cl.
C07F 9/09 (2006.01)

(52) U.S. Cl.
CPC .................................. C07F 9/091 (2013.01)

(58) Field of Classification Search
CPC ...... C07F 9/091; C23F 11/1673; C11D 3/362; C11D 11/00
See application file for complete search history.

(56) References Cited

U.S. PATENT DOCUMENTS

| | | | |
|---|---|---|---|
| 3,346,667 A * | 10/1967 | Firth | C07F 9/09 558/114 |
| 3,395,170 A | 7/1968 | Walts et al. | |
| 3,803,238 A | 4/1974 | Struve et al. | |
| 5,611,991 A * | 3/1997 | Naraghi | C09K 8/54 422/15 |
| 6,429,342 B1 | 8/2002 | Clement et al. | |
| 6,830,612 B1 | 12/2004 | Yatake et al. | |
| 6,977,236 B2 | 12/2005 | Eleveld et al. | |
| 2008/0045415 A1 | 2/2008 | Baur et al. | |
| 2010/0122622 A1 | 5/2010 | Takegawa | |

FOREIGN PATENT DOCUMENTS

| | | |
|---|---|---|
| DE | 4436066 A1 | 4/1996 |
| FR | 2138763 A1 | 1/1973 |
| GB | 758061 | 9/1958 |
| JP | 497212 B1 | 2/1974 |
| JP | 60119265 A | 6/1985 |
| JP | 01290604 A | 11/1989 |
| JP | 0920874 A | 1/1997 |
| JP | 2011105874 A | 6/2011 |
| JP | 2016044299 A | 4/2016 |
| JP | 2017048315 A * | 3/2017 |
| WO | 200042137 A2 | 7/2000 |
| WO | 0104183 A1 | 1/2001 |
| WO | 2009000852 A1 | 12/2008 |
| WO | 2009039018 A1 | 3/2009 |
| WO | 2012005897 A1 | 1/2012 |
| WO | 2012071149 A2 | 5/2012 |

OTHER PUBLICATIONS

Encyclopedia of Chemical Technology, 4th Edition, Kirk-Othmer, vol. 23, 1997, pp. 504-505 (Year: 1997).*
Ullmann's Encyclopedia of Industrial Chemistry, 5th Edition, Elvers, B., Hawkins, S., Schulz, G., vol. A 19, 1991, pp. 562-564. (Year: 1991).*
International Search Report and Written Opinion for International Application No. PCT/EP2018/052761, dated Jan. 25, 2019, 9 pages.
International Search Report and Written Opinion for International Application No. PCT/EP2018/052762, dated Feb. 12, 2019, 7 pages.
International Search Report and Written Opinion for International Application No. PCT/EP2018/052763, dated Apr. 24, 2019, 10 pages.
Kataoka et al., (1990): STN International CAPLUS database, (Columbus, Ohio), Accession No. 1990: 493313, one page.
Shirai et al., (2011): STN International CAPLUS database, (Columbus, Ohio), Accession No. 2011: 684667, one page.
Kadonome et al., (2014): STN International CAPLUS database, (Columbus, Ohio), Accession No. 2014: 1980740, one page.
Non Final Office Action for U.S. Appl. No. 16/761,379, dated Jan. 7, 2021, 16 pages.

(Continued)

Primary Examiner — James C Goloboy
(74) Attorney, Agent, or Firm — RatnerPrestia

(57) ABSTRACT

The invention relates to a compound of following formula (I), and also to the addition salts thereof with an organic or mineral base, the solvates such as hydrates and the mixtures thereof; to the use thereof as a surfactant, wetting agent, detergent, emulsifier, dispersant, corrosion inhibitor, plasticizer, sequestering agent, ionic liquid, stabilizer, lubricant, bitumen additive, gelling agent in oils, flotation collector for ores, adjuvant in the manufacture of plastic objects, antistatic agent, additive for fertiliser coverings and for enhanced oil recovery, and also to the compositions comprising at least one compound of formula (I) and/or a salt thereof, alone or as a mixture.

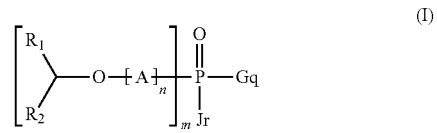

8 Claims, No Drawings

(56) References Cited

OTHER PUBLICATIONS

Domingo, X., "Alcohol and Alcohol Ether Sulfates," 1996, vol. 56, Chapter 5, pp. 223-312, Anionic Surfactants.
Dekker, M., "Phosphorus-Containing Anionic Surfactants: Organic Chemistry", vol. 56, Marcel Dekker, 1996, pp. 552-564.
Bakker, "Sulfonates and sulfates of sec-alkyl ethyl ether: detergents prepared by the addition of substituted alcohols to 1-alkenes", Chimie, Physique Et Applications Pratiques Des Agents De Sur Fact, Sep. 9, 1968, pp. 157-165.
Encyclopedia of Chemical Technology, 4th edition, Kirk Othmer, 1997, vol. 23, pp. 146-175.
Encyclopedia of Chemical Technology, 4th edition, Kirk-Othmer, 1997, vol. 23, pp. 504-505.
Johnson et al., "Topical mosquito repellents VII: Alkyl triethylene glycol monoethers", Journal of Pharmaceutical Sciences, Mar. 31, 1975, 64(4):693-695.
Stockburger et al., "The reactions of alkylene oxides with various butyl and other alcohols" JAOC, vol. 40, No. 10, Oct. 1, 1963, pp. 590-594.
Ullmann's Encyclopedia of Industrial Chemistry, 5th edition, Elvers, B., Hawkins, S., Schulz, G., 1994, vol. A 19, pp. 562-564.
Ullmann's Encyclopedia of Industrial Chemistry, 5th edition, Elvers, 15 B., Hawkins, S., Schulz, G., 1994, vol. A 25, pp. 778-783.
Wang et al., "Synthesis and properties of two surfactants containing polyoxypropylene block and short branched alkyl chain", Journal of Molecular Liquids, Elsevier, Amsterdam, NL, vol. 220, Apr. 26, 2016 (Apr. 26, 2016), pp. 101-107.
Non Final Office Action for U.S. Appl. No. 16/760,564, dated May 12, 2021, 8 pages.
Non Final Office Action for U.S. Appl. No. 16/760,564, dated Oct. 29, 2020, 13 pages.
Case Registry No. 771417-41-5, dated Oct. 28, 2004, 5 pages.
Case Registry No. 53640-13-4, dated Nov. 16, 1984, 5 pages.
Korean Notice of Grounds for Rejection for Korean Application No. 10-2020-7013149, dated Sep. 3, 2021, 11 pages.
Non Final Office Action for U.S. Appl. No. 16/761,379, dated Oct. 20, 2021, 14 pages.
Sugimoto et al., STN International Caplus database, Accession No. 1975:52646, 1975, 2 pages.
Notice of Allowance for U.S. Appl. No. 16/760,564, dated Jul. 7, 2022, 9 pages.

\* cited by examiner

SECONDARY ALCOHOL PHOSPHATE ESTER

CROSS-REFERENCE TO RELATED APPLICATIONS

This is the national phase of International Application No. PCT/FR2018/052762, filed 8 Nov. 2018, which claims priority to French Application No. 1760587, filed 10 Nov. 2017. The disclosure of each of these applications is incorporated herein by reference in its entirety for all purposes.

The present invention relates to the general field of alkoxylated secondary alcohols.

The present invention relates to the general field of secondary alcohol phosphate esters, i.e. alkoxylated secondary alcohols which have been subjected to a phosphatation reaction.

The phosphatation of organic alcohols is a well-known route for obtaining phosphate esters of organic alcohols. Phosphate esters of fatty alcohols are known as surfactants in various applications. Specifically, they have a certain number of unique properties in comparison with other cationic and anionic surfactants.

The main intermediary for the synthesis of phosphate esters of organic alcohols is the organic alcohol itself. Various properties for an alcohol phosphate ester may be obtained, depending on the organic alcohol chosen as starting material.

The organic alcohols used for synthesizing these phosphates may be of very different nature, for example: linear or branched, of small or large molar mass, monofunctional or polyfunctional, inter alia.

They may also be organic alcohols which have undergone an alkoxylation step, in which one or more units of an alkyl oxide, for example ethylene oxide or propylene oxide, have been incorporated into the organic alcohol.

The synthesis of phosphate esters of organic alcohols is of real industrial interest, if this synthesis is simple and inexpensive, notably starting with available starting materials that are readily modifiable to obtain various properties.

In addition, at a time when the environmental challenges are truly high, it is interesting to envisage using a biobased or biodegradable reagent having a good ecotoxicological profile.

Secondary alcohol alkoxylates are a family of compounds which offer a wide range of properties. Indeed, the applications are manifold. They may notably be used as solvent, hydrotrope or nonionic surfactant. They may also act as starting material to other compounds, such as etheramines or anionic surfactants obtained by phosphatation or sulfatation. Thus, secondary alcohol alkoxylates constitute a class of compounds that are of major industrial interest for many actors.

Secondary alcohol alkoxylates are conventionally synthesized by means of basic catalysis, for example using potassium hydroxide. Another type of catalyst may also be used, the catalyst of dimetal cyanide type, known as a DMC catalyst. Various documents mention the alkoxylation of various compounds, including alcohols, by basic catalysis and/or by DMC catalysis.

Thus, a phosphate ester of a secondary alcohol is sought, said alcohol being short-chained and alkoxylated, the alkoxylation of which is performed via a simple process that allows low-cost industrial and commercial development. It would also be advantageous to develop a process for preparing these phosphate esters using alkoxylated secondary alcohols, the starting compound of which is a biobased and biodegradable reagent.

One object of the present invention is to propose a solution for resolving the problems mentioned above.

One subject of the invention is a compound of formula (I) below, and also the addition salts thereof with an organic or mineral base, the solvates, such as hydrates, and mixtures thereof:

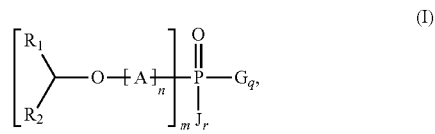

in which:

the groups $R_1$ and $R_2$, which may be identical or different, represent, independently of each other, a linear, branched or cyclic, saturated or unsaturated hydrocarbon-based group, comprising from 1 to 6 carbon atoms, it being understood that the sum of the carbon atoms of the groups $R_1$ and $R_2$ ranges from 2 to 7, $R_1$ and $R_2$ may form, together with the carbon atom that bears them, a 6-, 7- or 8-membered ring, n is an integer between, limits inclusive, 1 and 100, preferably between 2 and 100, more preferably between 3 and 100, more particularly between 5 and 100 and very preferably between 10 and 100, A represents a sequence of one or more units chosen from ethylene oxide, propylene oxide and butylene oxide units, and mixtures thereof, G denotes the group $—O—[B]_p—R_5$ in which $R_5$ represents a group chosen from a hydrogen atom or a linear, branched or cyclic, saturated or unsaturated hydrocarbon-based group, comprising from 1 to 30 carbon atoms, B represents a sequence of one or more units chosen from ethylene oxide, propylene oxide and butylene oxide units, and mixtures thereof, and p denotes an integer ranging from 0 to 100, J denotes the group $—O-[E]s-R_6$, in which $R_6$ represents a group chosen from a hydrogen atom or a linear, branched or cyclic, saturated or unsaturated hydrocarbon-based group, comprising from 1 to 30 carbon atoms, E represents a sequence of one or more units chosen from ethylene oxide, propylene oxide and butylene oxide units, and mixtures thereof, and s denotes an integer ranging from 0 to 100, m denotes an integer ranging from 1 to 3, q and r denote integers ranging from 0 to 2 it being understood that m +q +r =3.

A subject of the present invention is also the salts of the compounds described in formula (I) with one or more cationic groups bearing at least one cation chosen from an ammonium cation, a metal cation, a nitrogen cation, a boron cation and a phosphorus cation.

Examples of these salts may be described by formula (II) below:

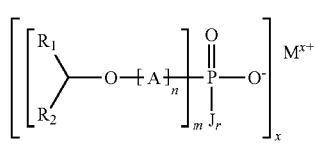

in which:
- $M^{x+}$ represents a cationic group bearing at least one cation chosen from an ammonium cation, a metal cation, a nitrogen cation, a boron cation and a phosphorus cation,
- x is an integer ranging from 1 to 7, and
- the other variables being as defined in formula (I) hereinabove.

Formula (II) is derived from formula (I), in which q denotes 1, p denotes 0 and $R_5$ represents a labile hydrogen atom.

A subject of the present invention is also a mixture of the compounds described in formula (I) and of the salts of the compounds described in formula (I) with metal cations and organic compounds including amines, illustrated in formula (II).

Another subject of the invention is the use of the compound of formula (I) according to the invention and salts thereof, as surfactant, low-foaming surfactant, wetting agent, foaming agent, hydrotrope, detergent, solvent, reactive solvent, coalescer, compatibilizer, emulsifying agent, dispersant, chemical intermediary, corrosion inhibitor, demulcent, plasticizer, sequestrant, mineral deposition inhibitor, ionic liquid, stabilizer, lubricant, bitumen additive, deinking additive, oil gellant, ore flotation collector, processing aid in the manufacture of plastics, antistatic agent, fertilizer coating additive, for plant protection, for treating textiles and for enhanced oil recovery, for the production of electrodes and electrolytes for batteries.

Other advantages and features of the invention will emerge more clearly on examining the detailed description.

It is specified that the expression "from . . . to . . . " used in the present description should be understood as including each of the limits mentioned.

For the purposes of the present invention, the term "ethylene oxide unit" refers to the unit derived from ethylene oxide after opening of the oxirane ring. For the purposes of the present invention, the term "propylene oxide unit" refers to the unit derived from propylene oxide after opening of the oxirane ring. For the purposes of the present invention, the term "butylene oxide unit" refers to the unit derived from butylene oxide after opening of the oxirane ring.

The compound according to the invention is of formula (I) as mentioned above.

In other words, the groups $R_1$ and $R_2$, and the carbon to which they are attached, denote a $C_3$-$C_8$, preferably $C_4$-$C_8$, more particularly $C_5$-$C_8$, preferably $C_6$-$C_8$, secondary radical.

Preferably, the radicals $R_1$ and $R_2$, which may be identical or different, represent, independently of each other, methyl, ethyl, n-propyl, isopropyl, n-butyl, sec-butyl, tert-butyl, pentyl or hexyl.

Preferably, the group formed by $R_1$, $R_2$ and the carbon atom to which $R_1$ and $R_2$ are attached is chosen from the 2-octyl radical and the 4-methyl-2-pentyl radical. More particularly, the group formed by $R_1$, $R_2$ and the carbon atom to which $R_1$ and $R_2$ are attached is the 2-octyl radical.

Advantageously, n is between, limits inclusive, 1 and 75, preferably between 2 and 75, more preferably between 3 and 75, more particularly between 5 and 75 and very preferably between 10 and 75.

Advantageously, n is between, limits inclusive, 1 and 50, preferably between 2 and 50, more preferably between 3 and 50, more particularly between 5 and 50 and very preferably between 10 and 50.

Advantageously, n is between, limits inclusive, 1 and 30, preferably between 2 and 30, more preferably between 3 and 30, more particularly between 5 and 30 and very preferably between 10 and 30.

Advantageously, p and s, independently of each other, are between, limits inclusive, 0 and 75, preferably between 1 and 75, more preferentially between 2 and 75, more preferably between 3 and 75, more particularly between 5 and 75 and very preferably between 10 and 75.

Advantageously, p and s, independently of each other, are between, limits inclusive, 0 and 50, preferably between 1 and 50, more preferentially between 2 and 50, more preferably between 3 and 50, more particularly between 5 and 50 and very preferably between 10 and 50.

Advantageously, p and s, independently of each other, are between, limits inclusive, 0 and 30, preferably between 1 and 30, more preferentially between 2 and 30, more preferably between 3 and 30, more particularly between 5 and 30 and very preferably between 10 and 30.

Preferably, n ranges from 2 to 30.

A, B and E, independently of each other, represent a sequence of one or more units chosen from ethylene oxide, propylene oxide and butylene oxide units, and mixtures thereof.

According to a particular embodiment, when the compound of formula (I) includes a mixture of said different units, they may be distributed randomly, alternately or in blocks.

According to a preferred embodiment, A represents a sequence of at least one ethylene oxide unit and of at least one propylene oxide unit, distributed alternately, randomly or in blocks. According to yet another preferred embodiment, A represents a sequence of at least one ethylene oxide unit and of at least one butylene oxide unit, distributed alternately, randomly or in blocks.

According to yet another preferred embodiment, A represents a sequence of at least one propylene oxide unit and of at least one butylene oxide unit, distributed alternately, randomly or in blocks.

According to a preferred embodiment, B represents a sequence of at least one ethylene oxide unit and of at least one propylene oxide unit, distributed alternately, randomly or in blocks.

According to yet another preferred embodiment, B represents a sequence of at least one ethylene oxide unit and of at least one butylene oxide unit, distributed alternately, randomly or in blocks.

According to yet another preferred embodiment, B represents a sequence of at least one propylene oxide unit and of at least one butylene oxide unit, distributed alternately, randomly or in blocks.

According to a preferred embodiment, E represents a sequence of at least one ethylene oxide unit and of at least one propylene oxide unit, distributed alternately, randomly or in blocks.

According to yet another preferred embodiment, E represents a sequence of at least one ethylene oxide unit and of at least one butylene oxide unit, distributed alternately, randomly or in blocks.

According to yet another preferred embodiment, E represents a sequence of at least one propylene oxide unit and of at least one butylene oxide unit, distributed alternately, randomly or in blocks.

Preferably, m is equal to 1 and G and J denote an —OH group.

Preferably, m is equal to 2 and G or J denotes an —OH group.

Preferably, p and s have the same meaning.

Preferably, the groups $R_5$ and $R_6$, independently of each other, denote a hydrocarbon-based chain comprising between 6 and 18 carbon atoms.

According to another preferred embodiment, $R_5$ is a hydrocarbon-based chain of between 6 and 18 carbon atoms.

According to a preferred embodiment of the invention:
the group formed by $R_1$, $R_2$ and the carbon atom to which $R_1$ and $R_2$ are attached is the 2-octyl radical,
n ranges from 3 to 15,
A represents a sequence of one or more units chosen from ethylene oxide, propylene oxide and butylene oxide units, and mixtures thereof,
G denotes an —OH group,
J denotes an —OH group,
m, q and r are equal to 1.

According to another preferred embodiment of the invention:
the group formed by $R_1$, $R_2$ and the carbon atom to which $R_1$ and $R_2$ are attached is the 2-octyl radical,
n ranges from 3 to 15,
A represents a sequence of one or more units chosen from ethylene oxide, propylene oxide and butylene oxide units, and mixtures thereof,
G denotes an —OH group,
m ranges from 1 to 2,
r is equal to 0,
q ranges from 1 to 2,
it being understood that m+q+r=3.

According to another preferred embodiment of the invention:
the group formed by $R_1$, $R_2$ and the carbon atom to which $R_1$ and $R_2$ are attached is the 2-octyl radical,
n ranges from 3 to 15,
A represents a sequence of one or more units chosen from ethylene oxide, propylene oxide and butylene oxide units, and mixtures thereof,
m is equal to 3,
r is equal to 0, and
q is equal to 0.

According to yet another preferred embodiment of the invention:
the group formed by $R_1$, $R_2$ and the carbon atom to which $R_1$ and $R_2$ are attached is the 2-octyl radical,
n ranges from 3 to 15,
A represents a sequence of one or more units chosen from ethylene oxide, propylene oxide and butylene oxide units, and mixtures thereof,
G denotes the group —O—[B]$_p$—$R_5$,
in which $R_5$ represents a linear, branched or cyclic, saturated or unsaturated hydrocarbon-based group comprising from 6 to 18 carbon atoms,
B represents a sequence of one or more units chosen from ethylene oxide, propylene oxide and butylene oxide units, and
p denotes an integer ranging from 0 to 100,
J denotes an —OH group,
m ranges from 1 to 2,
q ranges from 1 to 2,
r ranges from 0 to 1,
it being understood that m+q+r=3.

The invention also relates to mixtures of the phosphate esters of secondary alcohol according to formula (I) as defined above.

A subject of the invention is also the salts of the compounds of formula (I) as defined above. The salts may be addition salts with an organic or mineral base.

These salts may be salts of organonitrogen compounds, salts of organic amines, which may contain one or two or several amine groups, preferably alkylamines, alkyldiamines, cycloalkylamines, alkylamido(poly)amines, aromatic amines, and alkanolamines, said amines possibly being primary, secondary or tertiary, and also possibly being alkoxylated, preferably ethoxylated alkylamines, ethoxylated alkyldiamines, ethoxylated alkylamido(poly)amines.

The compounds of formula (I) may also be salts of heterocyclic amines, preferably imidazoline, said heterocyclic amines possibly being alkoxylated, preferably ethoxylated. The compounds of formula (I) may also be urea salts.

The salts of the compounds of formula (I) with the ammonium cation ($NH_4^+$) also form part of the invention.

These salts may be inorganic salts. Advantageously, the salts of the compounds of formula (I) with the elements from column 1 of the Periodic Table of the Elements (alkali metals), for instance lithium, sodium and potassium.

Advantageously, the salts of the compounds of formula (I) with the elements from column 2 of the Periodic Table of the Elements (alkaline-earth metals), for instance magnesium and calcium.

Advantageously, the salts of the compounds of formula (I) with the elements from columns 3 to 12 of the Periodic Table of the Elements (transition metals), for example the vanadium, manganese, cobalt, zirconium, yttrium, iron, cadmium and zinc.

Advantageously, the salts of the compounds of formula (I) with the elements from column 13 of the Periodic Table of the Elements, for instance aluminum.

Advantageously, the salts of the compounds of formula (I) with rare earths (lanthanides and actinides), for instance lanthanum, cerium, thorium, uranium and plutonium.

The compound described in formula (I) may advantageously be obtained by phosphatation of an alkoxylated secondary alcohol.

The phosphatation consists in reacting the alcohol with a phosphorous compound chosen from phosphorus pentoxide, (poly)phosphoric acid and a phosphoryl trihalide (for example trichloride).

The synthesis of phosphate esters and features of this process are described, for example, in the Encyclopedia of Chemical Technology, 4$^{th}$ Edition, Kirk-Othmer, volume 23, pages 504-505, (1997), in *Ullmann's Encyclopedia of Industrial Chemistry*, 5$^{th}$ Edition, Elvers, B., Hawkins, S., Schulz, G., volume A19, pages 562-564, or in *Phosphorous-containing Anionic Surfactants*, Wasow, G., and also in *Anionic Surfactants: Organic Chemistry*, volume 56, Marcel Dekker, (1996), pages 552-564.

Preferably, the secondary alcohol for synthesizing the compound of formula (I) is chosen from 2-octanol and methylisobutylcarbinol, preferably 2-octanol.

This alcohol is of particular interest in several respects. Specifically, it is a biobased, biodegradable product and has a good ecotoxicological profile. In addition, the boiling point of 2-octanol is high and its cost price is entirely reasonable.

According to a preferred embodiment, the alkoxylation of the secondary alcohol for synthesizing the compound of formula (I) is obtained by means of a catalyst of dimetal cyanide type, known as a DMC catalyst. Preferably, the catalyst of dimetal cyanide type may be of any nature known to a person skilled in the art. These catalysts are described in patents U.S. Pat. Nos. 6,429,342, 6,977,236 and PL 398 518.

More particularly, the catalyst used is zinc hexacyanocobaltate, which is sold, for example, by the company Bayer under the name Arcol® or by the company Mexeo under the name MEO-DMC®.

Another subject of the invention is the use of the compound of formula (I) according to the invention and salts thereof, alone or as a mixture, as surfactant, low-foaming surfactant, wetting agent, foaming agent, hydrotrope, detergent, solvent, reactive solvent, coalescer, compatibilizer, emulsifying agent, dispersant, chemical intermediary, corrosion inhibitor, demulcent, plasticizer, sequestrant, mineral deposition inhibitor, ionic liquid, stabilizer, lubricant, bitumen additive, deinking additive, oil gellant, ore flotation collector, processing aid in the manufacture of plastics, antistatic agent, fertilizer coating additive, for plant protection, for treating textiles and for enhanced oil recovery, for the production of electrodes and electrolytes for batteries.

A subject of the present invention is also a composition comprising at least one compound of formula (I) as defined previously, and/or a salt thereof, alone or as a mixture, with one or more aqueous, organic or aqueous-organic solvents, for instance water, alcohols, glycols, polyols, mineral oils, plant oils, and the like, alone or as mixtures of two or more thereof, in all proportions.

The composition according to the invention may also contain one or more additives and fillers that are well known to those skilled in the art, for instance, in a nonlimiting manner, anionic, cationic, amphoteric or nonionic surfactants, rheology modifiers, demulcents, deposition-inhibiting agents, antifoams, dispersants, pH control agents, colorants, antioxidants, preserving agents, corrosion inhibitors, biocides, and other additives, for instance sulfur, boron, nitrogen or phosphate products, and the like. The nature and amount of the additives and fillers may vary within wide proportions depending on the nature of the intended application and may readily be adapted by a person skilled in the art.

The invention is illustrated by the examples that follow, which are not in any way limiting.

EXAMPLES

The 2-octanol (CAS RN 123-96-6) used is the "refined" grade 2-octanol Oleris® (purity>99%), sold by Arkema France.

Example 1: Synthesis of a Propoxylated Phosphate Ester of 2-octanol

Step 1a: Propoxylation of 2-octanol 591 g (4.54 M) of 2-octanol dried to less than 200 ppm of water and 0.06 g (100 ppm) of catalyst DMC Arcol® are placed in a clean, dry 4 L autoclave. The reactor is closed and purged with nitrogen and the leaktightness under pressure is checked. The reactor is pressurized with nitrogen to 0.225 MPa at 27° C.

The reaction medium is brought to 90° C. with stirring, and the temperature is then increased to 120° C. At this temperature of 120° C., 40 g of propylene oxide are introduced. When initiation of the reaction is observed, the rest of the propylene oxide is introduced, i.e. 792 g (13.62 M) in total over 60 minutes at a temperature of 140° C.-150° C. At the end of the addition, the temperature is maintained for 30 minutes and the residual propylene oxide is then stripped out with nitrogen. The reactor is cooled to 60° C. and 1381 g of alkoxylated 2-octanol comprising 3 propylene oxide units are withdrawn.

Step 1b: Phosphatation of Propoxylated 2-octanol

Method a): Phosphatation With Phosphorus Pentoxide 456 g (1.50 M) of propoxylated 2-octanol obtained previously are placed in a 1 L reactor, under a nitrogen atmosphere. The reactor is heated to 60° C. 71 g (0.5 M) of phosphorus pentoxide are then added. The addition of the phosphorus pentoxide is performed while taking care to ensure that the temperature does not exceed 80° C. At the end of the addition, the temperature of the reactor is maintained at 80° C. for 3 hours with stirring. At the end of the reaction, the reactor is cooled to a temperature of 60° C. and the product is isolated.

521 g of alkoxylated phosphate ester of 2-octanol comprising 3 propylene oxide units are recovered.

The reaction is represented schematically below:

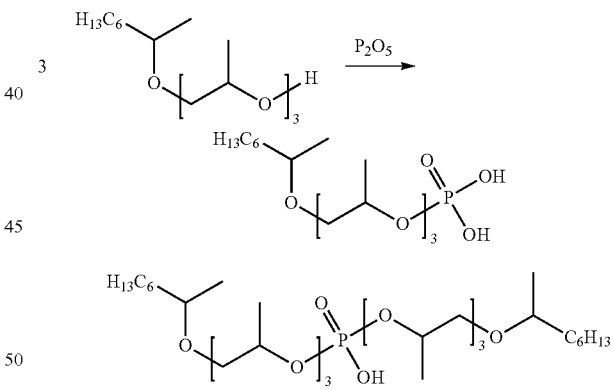

Method b): Phosphatation With Polyphosphoric Acid 186 g (0.61 M) of propoxylated 2-octanol containing 3 PO are placed in a 1 L reactor, under a nitrogen atmosphere. The reactor is heated to 50° C. and 67.6 g (0.2 M) of polyphosphoric acid (115% equivalent $H_3PO_4$) are then added dropwise. The reactor is heated to a temperature of 60° C., with stirring.

The reaction is monitored by determination of the acid number. The reaction is considered to be complete when the values no longer change. The reactor is then cooled to 40° C.

240 g of alkoxylated phosphate ester of 2-octanol comprising 3 propylene oxide units are recovered.

The reaction is represented schematically below:

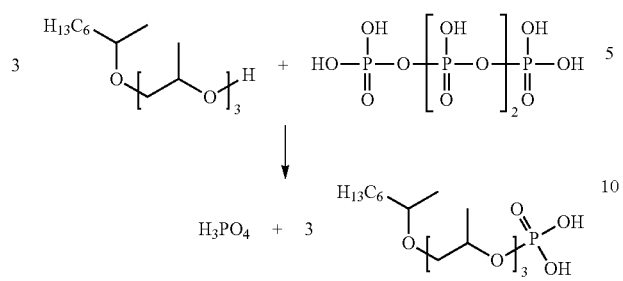

Method c): Phosphatation With Phosphoryl Trichloride 456 g (1.50 M) of propoxylated 2-octanol obtained previously are placed in a 1 L reactor, under a nitrogen atmosphere. The reactor is heated to 70° C. and 76.5 g (0.50 M) of anhydrous phosphoryl trichloride are then added dropwise. The reactor is then heated to a temperature of 90° C., with stirring.

The hydrochloric acid is removed continuously by sparging nitrogen into the reaction medium. The reaction is monitored by means of the amount of hydrochloric acid produced. The reaction is considered to be complete when no more HCl is evolved. The reactor is then cooled to 60° C.

470 g of alkoxylated 2-octanol phosphate comprising 3 propylene oxide units are recovered.

The reaction is represented schematically below:

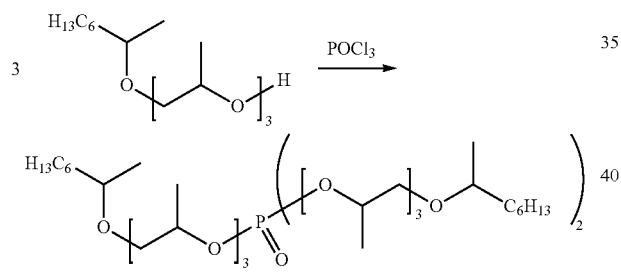

Example 2: Ethoxylated Phosphate Ester of 2-octanol

Step 2.a: Ethoxylation of 2-octanol 619 g (4.76 M) of 2-octanol dried to less than 200 ppm of water and 0.06 g (100 ppm) of catalyst DMC Arcol® are placed in a clean, dry 4 L autoclave. The reactor is closed and purged with nitrogen and the leaktightness under pressure is checked. The reactor is pressurized with nitrogen to 0.269 MPa at 20° C.

The reaction medium is brought to 120° C. with stirring. At this temperature of 120° C., 40 g of ethylene oxide are introduced. When initiation of the reaction is observed, the rest of the ethylene oxide is introduced, i.e. 628 g (14.27 M) in total over 60 minutes at a temperature of 140° C.-150° C. At the end of the addition, the temperature is maintained for 30 minutes and the residual ethylene oxide is then stripped out with nitrogen. The reactor is cooled to 60° C. and 1240 g of alkoxylated 2-octanol comprising 3 ethylene oxide units are withdrawn. (OHN: 210 mg of KOH/g and coloration of 26 Hz).

Step 2.b: Phosphatation of Ethoxylated 2-octanol

The phosphatation reaction is repeated with phosphorus pentoxide as described in example 1, step 1 b, method a), but with the product obtained in step 2a above.

Example 3: Salification with a Metal 465 g (1 M) of the ethoxylated 2-octanol phosphate obtained in example 2 as described previously are placed in a 1 L reactor. The reactor is heated to 125° C. 81 g (1 M) of zinc oxide are then added. The addition of the zinc oxide is performed with stirring. At the end of the addition, the temperature of the reactor is maintained at 125° C. for 2 hours with stirring. At the end, the reactor is cooled to a temperature of 60° C. and the product is isolated.

About 540 g of the zinc salt of the alkoxylated phosphate ester of 2-octanol comprising 3 ethylene oxide units are recovered.

Example 4: Salification With a Fatty Amine 465 g (1 M) of the ethoxylated 2-octanol phosphate obtained in example 2 as described previously are placed in a 1 L reactor. The reactor is heated to 80° C. 259 g (1 M) of a fatty amine bearing a chain of about 18 carbon atoms, sold by Arkema France under the name Noram SH®, are then added with stirring while taking care to ensure that the temperature does not exceed 80° C. At the end of the addition, the temperature of the reactor is maintained at 80° C. for 15 minutes with stirring. At the end, the reactor is cooled and recovered.

About 720 g of the fatty amine salt of the alkoxylated phosphate ester of 2-octanol comprising 3 ethylene oxide units are recovered.

The invention claimed is:

1. A salt of a compound of formula (I) below:

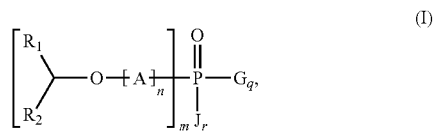

wherein:
the group formed by $R_1$, $R_2$ and the carbon atom to which $R_1$ and $R_2$ are attached is selected from a 2-octyl radical and a 4-methyl-2-pentyl radical;
n is an integer between, limits inclusive, 1 and 100;
A represents a sequence of one or more units chosen from ethylene oxide, propylene oxide and butylene oxide units, and mixtures thereof;
G denotes the group —O—$[B]_p$—$R_5$;
$R_5$ represents a group chosen from a hydrogen atom or a linear, branched or cyclic, saturated or unsaturated hydrocarbon-based group, comprising from 1 to 30 carbon atoms;
B represents a sequence of one or more units chosen from ethylene oxide, propylene oxide and butylene oxide units, and mixtures thereof;
p denotes an integer ranging from 0 to 100;
J denotes the group —O-$[E]_s$-$R_6$,
$R_6$ represents a group chosen from a hydrogen atom or a linear, branched or cyclic, saturated or unsaturated hydrocarbon-based group, comprising from 1 to 30 carbon atoms;

E represents a sequence of one or more units chosen from ethylene oxide, propylene oxide and butylene oxide units, and mixtures thereof;

s denotes an integer ranging from 0 to 100;

m denotes an integer ranging from 1 to 3; and q and r denote integers ranging from 0 to 2, where m+q+r=3, wherein the compound is in ammonium salt form or in organic amine salt form, the organic amine being chosen from alkylamines, alkyldiamines, cycloalkylamines, alkylamido(poly)amines, aromatic amines and alkanolamines, the amine optionally being primary, secondary or tertiary, and also optionally being alkoxylated, and also from heterocyclic amines, urea, and mixtures thereof.

2. The salt as claimed in claim 1, wherein n is between, limits inclusive, 1 and 75.

3. The salt as claimed in claim 1, wherein p and s, independently of each other, are between, limits inclusive, 0 and 75.

4. A composition comprising at least one salt of a compound of formula (I) at least one compound of formula (I) as defined in claim 1, with one or more aqueous, organic or aqueous-organic solvents, and optionally one or more additives and fillers.

5. A salt of a compound of forumla (I) below:

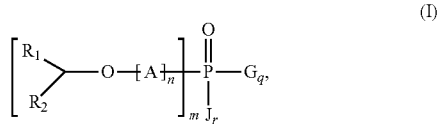

wherein:
the group formed by $R_1$, $R_2$ and the carbon atom to which $R_1$ and $R_2$ are attached is selected from a 2-octyl radical and a 4-methyl-2-pentyl radical;

n is an integer between, limits inclusive, 1 and 100;

A represents a sequence of one or more units chosen from ethylene oxide, propylene oxide and butylene oxide units, and mixtures thereof;

G denotes the group $—O—[B]_p—R_5$;

$R_5$ represents a group chosen from a hydrogen atom or a linear, branched or cyclic, saturated or unsaturated hydrocarbon-based group, comprising from 1 to 30 carbon atoms;

B represents a sequence of one or more units chosen from ethylene oxide, propylene oxide and butylene oxide units, and mixtures thereof;

p denotes an integer ranging from 0 to 100;

J denotes the group $—O-[E]s-R_6$, $R_6$ represents a group chosen from a hydrogen atom or a linear, branched or cyclic, saturated or unsaturated hydrocarbon-based group, comprising from 1 to 30 carbon atoms;

E represents a sequence of one or more units chosen from ethylene oxide, propylene oxide and butylene oxide units, and mixtures thereof;

s denotes an integer ranging from 0 to 100;

m denotes an integer ranging from 1 to 3; and q and r denote integers ranging from 0 to 2, where m+q+r=3, wherein the compound is in the form of an inorganic salt chosen from the elements from column 1 of the Periodic Table of the Elements; the elements from column 2 of the Periodic Table of the Elements, the elements from columns 3 to 12 of the Periodic Table of the Elements, the elements from column 13 of the Periodic Table of the Elements, and mixtures thereof.

6. The salt as claimed in claim 5, wherein n is between, limits inclusive, 1 and 75.

7. The salt as claimed in claim 5, wherein p and s, independently of each other, are between, limits inclusive, 0 and 75.

8. A composition comprising at least one salt of a compound of formula (I) as defined in claim 5, with one or more aqueous, organic or aqueous-organic solvents, and optionally one or more additives and fillers.

* * * * *

UNITED STATES PATENT AND TRADEMARK OFFICE
CERTIFICATE OF CORRECTION

PATENT NO. : 11,548,904 B2
APPLICATION NO. : 16/761652
DATED : January 10, 2023
INVENTOR(S) : Juan Antonio Gonzalez Leon et al.

It is certified that error appears in the above-identified patent and that said Letters Patent is hereby corrected as shown below:

In the Claims

Claim 4, Column 11, Line 19-23 should read --A composition comprising at least one salt of a compound of formula (I) as defined in claim 1, with one or more aqueous, organic or aqueous-organic solvents, and optionally one or more additives and fillers.--

Claim 5, Column 12, Line 10 should read --J denotes the group $-O-[E]_s-R_e$;--

Signed and Sealed this
Twentieth Day of June, 2023

Katherine Kelly Vidal
*Director of the United States Patent and Trademark Office*